Aug. 4, 1936. A. G. J. RAPP ET AL 2,049,866
MULLER TYPE MIXER
Filed Dec. 9, 1932 3 Sheets-Sheet 1
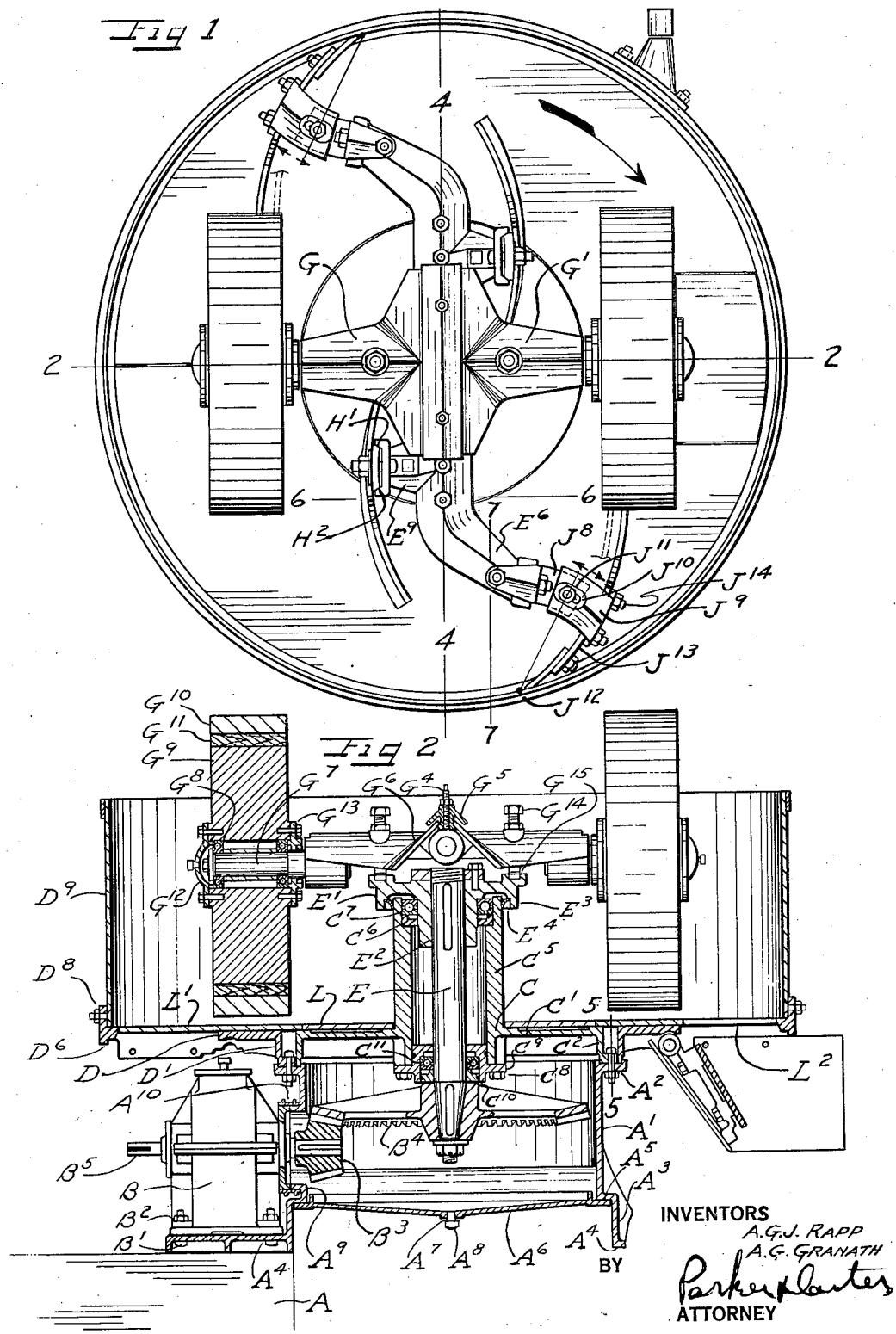
INVENTORS
A.G.J. RAPP
A.G. GRANATH
BY
Parker Carter
ATTORNEY

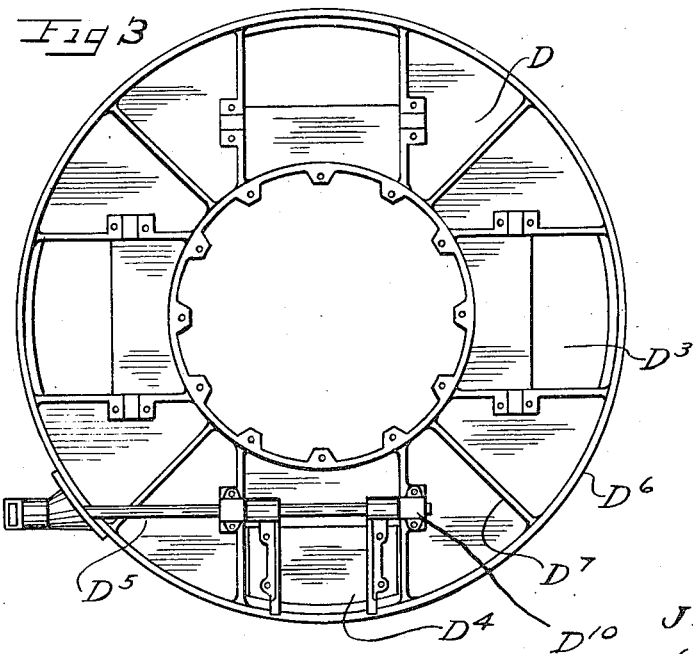
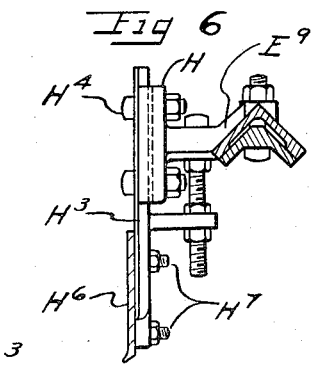
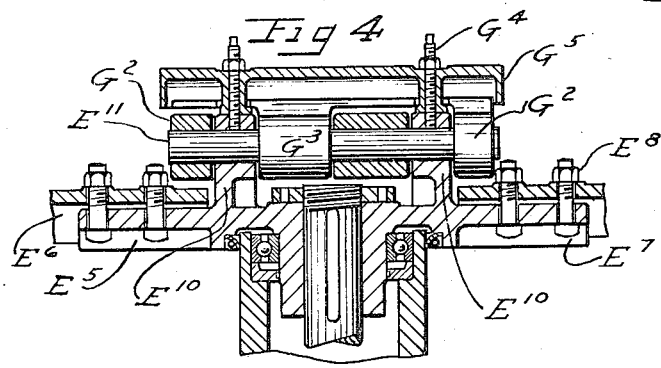
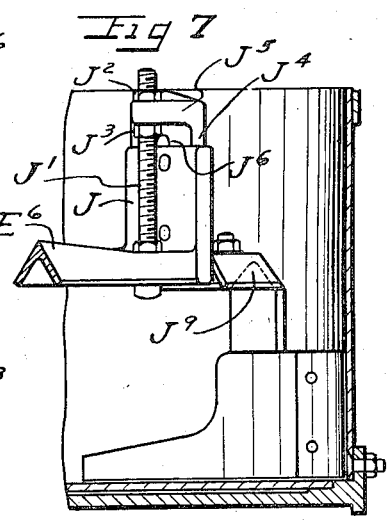
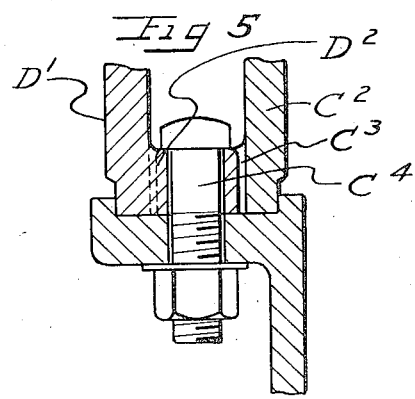

Aug. 4, 1936.  A. G. J. RAPP ET AL  2,049,866

MULLER TYPE MIXER

Filed Dec. 9, 1932  3 Sheets-Sheet 3

INVENTORS
A.G.J. RAPP
A.G. GRANATH
BY Parker Carter
ATTORNEY

Patented Aug. 4, 1936

2,049,866

UNITED STATES PATENT OFFICE 2,049,866

MULLER TYPE MIXER

Axel G. J. Rapp, Evanston, and Axel G. Granath, Chicago, Ill.

Application December 9, 1932, Serial No. 646,452

9 Claims. (Cl. 83—45)

Our invention relates to an improvement in muller type mixers and has for one object the provision of an improved and simplified structure for such mixers. Another object is the provision of improved supporting and adjusting means for the muller rolls. Another object is the provision of improved means for supporting and assembling the muller bed. Another object is the provision of improved means for holding and adjusting the plows of such a muller. Another object is the provision of improved driving means for such a muller. Another object is the provision of improved lubricant containing means in association with the base. Other objects will appear from time to time in the course of the specification and claims.

We illustrate our invention more or less diagrammatically in the accompanying drawings, wherein—

Figure 1 is a plan view of our structure;

Figure 2 is a section taken on the line 2—2 of Figure 1;

Figure 3 is a view, from below, of the bed;

Figure 4 is a section on an enlarged scale taken on the line 4—4 of Figure 1;

Figure 5 is a section on an enlarged scale on the line 5—5 of Figure 2;

Figure 6 is a section on the line 6—6 of Figure 1;

Figure 7 is a section on the line 7—7 of Figure 1;

Like parts are indicated by like symbols throughout the specification and drawings.

Figure 8:
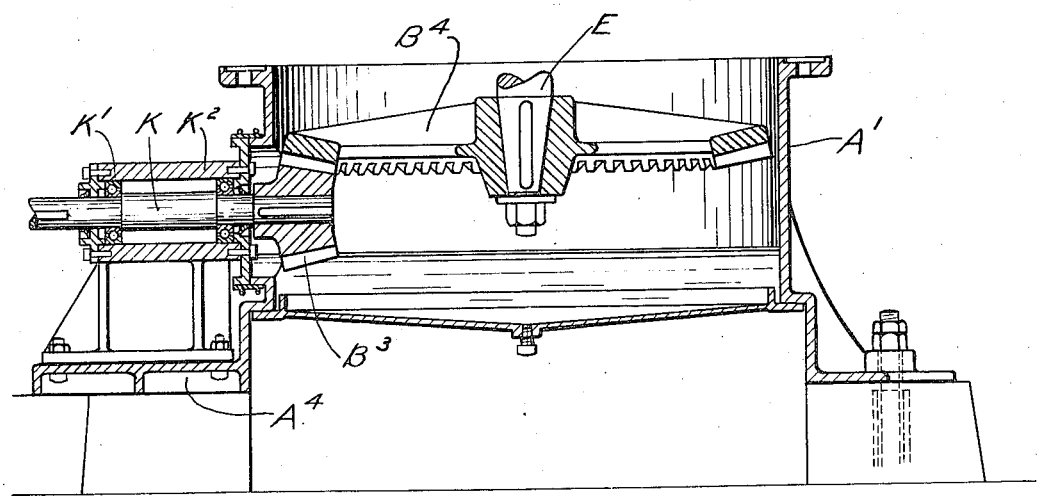
Figure 8 is a partial section similar to Figure 2 of a variant drive.

Referring to the drawings, A generally indicates any suitable surface or support upon which the device may be positioned. $A^1$ is a base which may be a single casting of generally cylindrical shape having an upper outwardly extending flange $A^2$, an intermediate lower set-off $A^3$, and a bottom flange $A^4$. The set-off $A^3$ provides an outwardly extending portion $A^5$ against which may be secured in any suitable fashion an oil pan $A^6$ with a central oil outlet $A^7$ closed by any suitable means for example by the screw-threaded headed member $A^8$. $A^9$ indicates a flanged opening at one side of the member $A^1$, the purpose for which will later appear.

Mounted upon the lateral extension of the flange $A^4$, we show in Figure 2 a gear reducer structure generally indicated as B, the details of which do not form part of the present invention. It is shown as removably supported upon the member $A^4$, being positioned for example by the bolts $B^1$ with the nuts $B^2$. It carries a bevel pinion $B^3$ which extends inwardly through the flanged opening $A^9$ into the interior of the base $A^1$ where it meshes with the bevel gear $B^4$. $B^5$ is any suitable shaft whereby, through the gear reducer, the pinion $B^3$ may be rotated and thus drive the gear $B^4$. $A^{10}$ indicates any suitable oil seal.

C generally indicates a center casting structure which includes or has cast integral with it an outward extension $C^1$ terminating in a downward flange $C^2$ adapted to rest upon the flange $A^2$ of the base $A^1$. As shown in Figure 5, the flange $C^2$ may have outward extensions or ears $C^3$ through which pass any suitable securing bolts $C^4$, whereby the center casting is secured in position upon the base $A^1$. The center casting further includes an upwardly extending cylinder or turret $C^5$, which is apertured to receive a bearing flange $C^6$ for the ball or roller bearing generally indicated as $C^7$. Secured to the lower portion of the sleeve $C^5$, as by bolts $C^8$ is the lower bearing cup $C^9$ which with the bearing spacer $C^{10}$ receives the ball bearing $C^{11}$.

Also supported upon the flange $A^2$ is the muller bed generally indicated as D which has an inner flange $D^1$ provided with ears $D^2$ through which pass locking bolts $C^4$. As will be clear from Figure 5 the flanges or ears $C^3$ and $D^2$ alternate or are staggered about the flange $A^2$, both the center casting C and the bed D being supported upon the same flange and both being separately removable therefrom. The bed is provided with a plurality of door openings $D^3$ which may be closed by any suitable doors $D^4$ actuated by any suitable shaft $D^5$ from a mechanism not herein shown. $D^5$ is held in place by bearing caps $D^{10}$, thus enabling the user to drop the gate mechanism, the caps $D^{10}$ being removably bolted to the bed. The bed is provided also with an outer flange $D^6$, the flanges $D^1$ and $D^6$ being connected for example by strengthening ribs $D^7$. The bed is provided also with an upwardly extending peripheral flange $D^8$ to which is secured any suitable crib $D^9$. It will be observed that we have illustrated in Figure 3 no less than four door openings, three of which may be covered by the plate $L^1$. It will be further understood that the bed D may be shifted in relation to the base $A^1$ to any desired degree. The bed, which is separate from the center casting or turret C, may be positioned to set its door or doors at any desired point, since the turret lugs $C^3$ and the bed lugs $D^2$ are in staggered relation, and any single bolt $C^4$ on the base may be used to secure either a turret lug or a bed lug depending upon what particular adjustment is made.

E generally indicates a vertical shaft to the bottom of which is keyed or otherwise secured the bevel gear $B^4$. The lower portion of the shaft is received by the ball or roller bearings $C^{11}$. The lower bearing spacer $C^{10}$ may be secured in relation to the shaft E and any suitable packing or wiping means may be interposed between it and the bearing cup $C^9$. $E^1$ indicates a cross-head which may be keyed to the upper portion of the shaft E and which includes a downwardly extending hub $E^2$ positioned within the ball or roller bearing $C^7$. The cross-head overhangs the upper edge of the central turret $C^5$ as at $E^3$ and packing or oil seal means $E^4$ are provided within the overhang as will be clear from Figures 2 and 4. The crosshead is provided with diametrically opposed lateral extensions $E^5$, to which are secured plow beams $E^6$. These may be removably secured as by the bolts $E^7$ and nuts $E^8$. The plow beams may have lateral extensions as at $E^9$, the purpose for which will later appear. Upwardly extending from the cross-head are the driving lugs $E^{10}$ through which passes the cross-head shaft $E^{11}$.

Mounted on the cross-head shaft are the two muller arms G, $G^1$. Each muller arm is provided with two eyes, and outside eye $G^2$ mounted on the end of the shaft $E^{11}$ and an inner eye $G^3$ mounted on the shaft between the two driving lugs $E^{10}$. As will be clear from Figure 4, these eyes are staggered, those shown in section being associated with one arm and those shown in side elevation being connected with the other. Endwise movement of the shaft $E^{11}$ is prevented as by the screws $G^4$ which also serve to hold in position the cover plate $G^5$ which overhangs the edges of the muller arms G, $G^1$. Note that the muller arms are provided with inclined cover portions $G^6$ the upper edges of which penetrate beneath the cover plate $G^5$ as will be clear from Figure 2. Note also that the muller arms are formed with sloping faces, as will be clear from Figures 1 and 2, so as to shed the sand. Secured to the ends of the muller arms are bearing pins $G^7$ each having a plurality of roller bearings $G^8$ about which rotates the muller center $G^9$ with its rim $G^{10}$ spaced or secured as for example by wooden wedges $G^{11}$. $G^{12}$ $G^{13}$ are any suitable bearing protecting plates. The downward movement of the muller assembly as a whole may be limited as by the adjusting set screws $G^{14}$ which engage adjusting screw discs $G^{15}$ on the cross head E. Thereby, the closest approach of the mullers to the bottom of the pan may be limited as shown for example in Figure 2.

Mounted on the lateral projections $E^9$ of each plow arm or beam $E^6$, as shown in detail in Figure 6, is an abutment plate H having vertical edge flanges as at $H^1$ with opposed wedge faces $H^2$ which engage correspondingly formed faces upon the inside plow support member $H^3$. $H^3$ may be vertically adjusted in relation to H, being adjustably held in position as by the bolts $H^4$ with the nuts $H^5$. The inside plow structure proper, $H^6$, is adjustably secured to the support $H^3$, as by the bolts $H^7$. The inside plow is preferably adjusted to approach rather closely to the bed and serves to move the sand or material treated outwardly toward the muller rims $G^{10}$. At the extremity of each plow beam $E^6$, as shown in Figure 7, is an abutment member J which may be formed integrally with the end of the arm $E^6$. Positioned near it is an adjusting bolt $J^1$ with upper and lower adjusting nuts $J^2$ $J^3$. $J^4$ is an outside plow holding strap, with an upper flange $J^5$ which extends inwardly over the top of the abutment J and is apertured to receive the adjusting screw $J^1$, in relation to which it may be adjustably secured as by the nuts $J^2$ $J^3$. The strap $J^4$ is vertically slotted as at $J^6$, through which slots pass any suitable adjusting bolts $J^7$, whereby the assembly may be clamped in any desired position of adjustment. The strap further extends out from its lower portion with an arcuate extension $J^8$ which is V-shaped in cross section. Adjustably secured to it is an extension $J^9$ slotted as at $J^{10}$ to receive the adjusting securing bolt $J^{11}$ whereby the member $J^9$ may in effect be extended. The two parts are of arcuate shape and it will be noted that their arc describes a center about the point $J^{12}$ which is adjacent the edge of the outer plow $J^{13}$ which is secured in position as by any securing bolts $J^{14}$. By the employment of this relationship of parts the plow may be adjusted as to angle, while always maintaining its edge adjacent the inner face of the crib $D^9$, as will be clear from Figure 1.

It will be realized that whereas we have described and shown a practical and operative device, nevertheless many changes might be made in the size, shape, number and disposition of parts without departing from the spirit of our invention. We therefore wish our description and showing to be taken as in a broad sense illustrative and diagrammatic rather than as limiting us to our specific showing.

Figure 9:
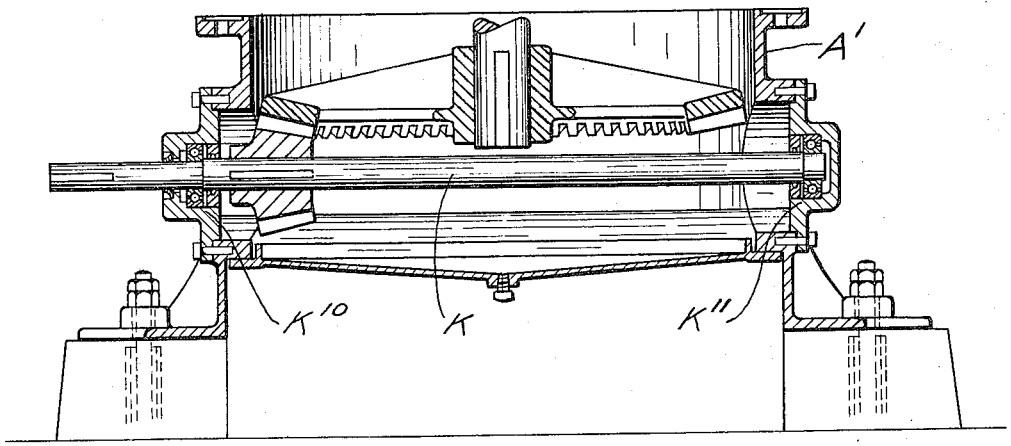
Figure 9 is a similar section of a further variant drive.

For example, in Figure 8 we illustrate a variant form of drive in which the gear reduction B is omitted and in its place is positioned a single straight shaft K mounted in roller bearings $K^1$ and a sleeve $K^2$ mounted upon the lateral extension $A^4$ of the base $A^1$. As a further modification of the drive we illustrate in Figure 9 a shaft K extending all the way across the base $A^1$ having bearings $K^{10}$ at one side of the base $A^1$ and $K^{11}$ at the other.

The use and operation of our invention are as follows:

We provide a simple, convenient and economic type of muller in which for example the base $A^1$ serves also as a lubricant container for the drive. The central casting with the upper turret $C^5$ serves as cover for the base and encloses the drive and thus houses the lubricant. It also supports the floor or bed L on which the inner portion of the material to be operated upon rests. The bed which receives the weight of the mullers, namely the outer bed structure $L^1$, rests upon the main bed structure D and is readily removable therefrom. The bed structure D is itself readily removable from the machine. In other words, the bed D may be removed without disturbing the central structure or the central structure may be removed without disturbing the bed or both may be removed, for complete disassembly of the plants. While the bed $L^1$ preferably has but a single opening $L^2$ which may be aligned with any suitable discharge gate, more may be provided. Note that the bolts $C^4$ and their corresponding bolt holes are spaced fifteen degrees apart about the flange $A^2$. As each bolt hole may with equal ease receive a bolt for holding the bed D or the central casting C, since the lugs for the two parts interpenetrate or are staggered, it is clear that the bed may be set with the discharging gates at any desired point in relation to the machine.

The ball bearings which support the cross head and the mullers do not deliver any stress to the shaft itself. These bearings are at the top of the central casting C and the upper portion $C^5$ thereof and the delivery of weight is through the muller and the muller arms to the cross head E and from the cross head to the ball bearings $C^7$ and thence to the upper edge of the sleeve C and thus downwardly to the flange $A^2$ and the base $A^1$. This permits ready adjustment of the vertical shaft E which is keyed to the cross head, as the shaft does not itself receive any weight from the muller or cross head. However, the upper ball bearings $C^7$ do center the shaft and cross head and take whatever lateral thrust there is, in connection of course with the lower ball bearings $C^9$.

Note that there are two driving lugs $G^2$ cast with or formed integrally with the cross head structure $E^1$, which cross heads receive the shaft $E^{11}$ on which the muller arms or beams are mounted. These two driving lugs deliver the rotary force necessary to rotate the muller arms and mullers. They are sufficiently far apart efficiently to deliver the required force. Note that these driving lugs also receive the set screws $G^4$ which hold the shaft $E^{11}$ from rotation and which hold the cover plate $G^5$ in position. The muller arms or beams are rotatably mounted upon this shaft, each muller arm having a pair of hubs which interpenetrate or are staggered along the shaft. These hubs are positioned under the cover plate $G^5$ and are therefore protected from sand or the like. The arms have sloping sides to conform to the cover plate $G^5$, forming a species of roof or protection with overlapping eaves. Note that each muller arm is individually adjustable, as by the adjusting screw $G^{14}$ to limit its downward movement toward the bed.

The inner plows move the sand outwardly toward the muller rims $G^{10}$ and the outer plows move the sand inwardly toward the mullers, thus insuring that the material is thoroughly mixed and that all of it is directed into the path of the heavy muller rollers. Each plow is individually adjustable vertically and, what is quite important, the outer plows are readily adjustable as to angle, as has already been described.

We claim:

1. In a muller, a hollow base member, a unitary bed supporting structure mounted upon and closing the top of said base member, said structure including a sleeve upwardly extending from the level of the bed, a bed mounted upon said bed supporting structure, and a muller structure including a part rotatable in said sleeve and muller elements located at a level above said bed, and an additional bed supporting structure positioned upon said base member and surrounding said first mentioned bed supporting structure, and an additional bed member mounted thereon.

2. In a muller, a hollow base member, a unitary bed supporting structure mounted upon and closing the top of said base member, said structure including a sleeve upwardly extending from the level of the bed, a bed mounted upon said bed supporting structure, a muller structure including a part rotatable in said sleeve, muller elements located at a level above said bed, an additional bed supporting structure positioned upon said base member and surrounding said first mentioned bed supporting structure, and an additional bed member mounted thereon, said base member being provided with a peripheral flange about its upper edge, said two bed supporting structures including portions resting upon said flange.

3. In a muller, a hollow base member, a bed structure mounted upon and closing the top of said base member, said structure including a sleeve upwardly extending from the level of the bed structure, and a muller structure, including a part rotatable in said sleeve and muller elements located at a level above said bed structure, and an additional bed structure positioned upon said base member and surrounding said first mentioned bed structure, both said bed structures being individually removable from the hollow base member.

4. In a muller, a hollow base member, a bed structure mounted upon and closing the top of said base member, said structure including a sleeve upwardly extending from the level of the bed structure, and a muller structure, including a part rotatable in said sleeve and muller elements located at a level above said bed structure, and an additional bed structure positioned upon said base member and surrounding said first mentioned bed structure, both said bed structures being individually removable from the hollow base member and securing means intermediate the bed structures and the hollow base member, adapted to secure said bed structures in relation to the hollow base member at a plurality of angular relationships.

5. In a muller, a hollow base member, a bed structure mounted upon and closing the top of said base member, said structure including a sleeve upwardly extending from the level of the bed structure, and a muller structure, including a part rotatable in said sleeve and muller elements located at a level above said bed structure, and an additional bed structure positioned upon said base member and surrounding said first mentioned bed structure, both said bed structures being individually removable from the hollow base member and angularly adjustable thereabout, said base member being provided with a peripheral flange about its upper edge, said two bed structures including portions resting upon said flange.

6. In a muller, a base member, a bearing sleeve extending vertically upwardly therefrom, a vertical shaft rotatably mounted in said sleeve, a cross head held against rotation in relation to said shaft, means for rotating said shaft and cross head, driving lugs upwardly extending from said cross head and widely spaced apart upon opposite sides of its axis of rotation, a cross shaft positioned in said driving lugs, muller arms pivoted to said shaft and mullers rotatably mounted upon said muller arms, and a cover plate mounted upon said cross head and overlying and shielding the abutting ends of said muller arms.

7. In a muller, a base member, a bearing sleeve extending vertically upwardly therefrom, a vertical shaft rotatably mounted in said sleeve, a cross head held against rotation in relation to said shaft, means for rotating said shaft and cross head, driving lugs upwardly extending from said cross head and widely spaced apart upon opposite sides of its axis of rotation, a cross shaft positioned in said driving lugs, muller arms pivoted to said cross shaft and mullers rotatably mounted upon said muller arms, each said muller arm having a plurality of hubs engaging said cross shaft on opposite sides of the axis of said vertical shaft, the hubs of the muller arms being staggered along said cross shaft.

8. In a muller, a base member, a muller bed, muller members and means for moving them across said bed, plow beams and means for rotating them above said bed and plows mounted upon the end of said plow beams and means for adjusting said plows angularly while maintaining the edges of said plows at a predetermined distance from the center of rotation of the plow beams including opposed engaging surfaces cooperatively carried by the plows and beams and shaped and dimensioned to limit angular movement of the plows with respect to the beams to movement about points coinciding substantially with the leading edges of the plows.

9. In a muller, a base member, a muller bed, muller members and means for moving them across said bed, plow beams and means for rotating them above said bed and plows mounted upon the end of said plow beams and means for adjusting said plows angularly while maintaining the edges of said plows at a predetermined distance from the center of rotation of the plow beams, including opposed arcuate engaging members on plows and beams, the center of their arc being adjacent to the periphery of the bed in substantial coincidence with the point of intersection therewith of the leading edge of the plow, and means for securing them together in adjusted position.

AXEL G. J. RAPP.
AXEL G. GRANATH.